United States Patent
Li et al.

(10) Patent No.: US 12,541,643 B1
(45) Date of Patent: *Feb. 3, 2026

(54) SMART DETECTION OF AND TEMPLATES FOR CONTRACT EDITS IN A WORKFLOW

(71) Applicant: Ironclad, Inc., San Francisco, CA (US)

(72) Inventors: Jason Li, San Francisco, CA (US); Cai GoGwilt, San Francisco, CA (US)

(73) Assignee: Ironclad, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/533,602

(22) Filed: Dec. 8, 2023

Related U.S. Application Data

(63) Continuation of application No. 17/505,470, filed on Oct. 19, 2021, now Pat. No. 11,880,650.

(60) Provisional application No. 63/105,784, filed on Oct. 26, 2020, provisional application No. 63/105,764, filed on Oct. 26, 2020.

(51) Int. Cl.
  *G06F 40/197* (2020.01)
  *G06F 40/166* (2020.01)
  *G06F 40/169* (2020.01)
  *G06Q 10/101* (2023.01)

(52) U.S. Cl.
  CPC ......... *G06F 40/197* (2020.01); *G06F 40/166* (2020.01); *G06F 40/169* (2020.01); *G06Q 10/101* (2013.01)

(58) Field of Classification Search
  CPC ............................ G06F 40/197; G06Q 10/101
  See application file for complete search history.

(56) References Cited

U.S. PATENT DOCUMENTS

| | | | |
|---|---|---|---|
| 5,778,361 A | | 7/1998 | Nanjo et al. |
| 5,805,889 A | * | 9/1998 | Van De Vanter ......... G06F 8/71 717/121 |

(Continued)

FOREIGN PATENT DOCUMENTS

| | | |
|---|---|---|
| CN | 108269063 A | 7/2018 |
| CN | 110096681 A | 8/2019 |
| CN | 112580310 A | 3/2021 |

OTHER PUBLICATIONS

G. Salton, "Automatic text indexing using complex identifiers," DOCPROCS '88: Proceedings of the ACM conference on Document processing systems, Jan. 2000 pp. 134-144.

(Continued)

*Primary Examiner* — Benjamin Smith
(74) *Attorney, Agent, or Firm* — Banner & Witcoff, Ltd.

(57) ABSTRACT

Various aspects of the subject technology relate to systems, methods, and machine-readable media for detecting changes to uploaded documents in a workflow platform. Various aspects may include determining changes between various versions of a media file. Aspects may include detecting what portions of the media file change relative to different instances of the various media file versions. Aspects may also include updating a template element to incorporate the changes to the portions of the media file so that the template element may be used to regenerate a new version of the media file with the incorporated changes being reflected by the template element. Aspects may include determining a new location of text within a portion of the media file that is changed between versions of the media file.

17 Claims, 8 Drawing Sheets

(56) References Cited

U.S. PATENT DOCUMENTS

| | | | | |
|---|---|---|---|---|
| 7,149,966 | B2* | 12/2006 | Jones | G06F 40/117 715/255 |
| 7,290,251 | B2* | 10/2007 | Livshits | G06F 8/71 715/229 |
| 7,299,450 | B2* | 11/2007 | Livshits | G06F 8/71 717/121 |
| 7,593,943 | B2* | 9/2009 | Clarke | G06F 16/273 |
| 7,797,274 | B2* | 9/2010 | Strathearn | G06F 16/345 715/229 |
| 7,916,332 | B2* | 3/2011 | Kato | G06F 3/1246 709/201 |
| 7,933,952 | B2* | 4/2011 | Parker | G06F 40/166 709/204 |
| 7,953,794 | B2* | 5/2011 | Clarke | G06F 40/197 709/227 |
| 8,126,882 | B2* | 2/2012 | Lawyer | G06F 16/25 707/723 |
| 8,131,730 | B2 | 3/2012 | Hajela et al. | |
| 8,200,617 | B2 | 6/2012 | Spivack et al. | |
| 8,407,670 | B2* | 3/2013 | Hegde | G06F 8/71 717/122 |
| 8,418,055 | B2 | 4/2013 | King et al. | |
| 8,719,786 | B2* | 5/2014 | Waddington | G06F 8/71 717/122 |
| 8,763,919 | B1 | 7/2014 | Washington | |
| 8,826,222 | B2* | 9/2014 | Bak | G06F 8/71 717/136 |
| 8,839,196 | B2 | 9/2014 | Clemm et al. | |
| 8,868,506 | B1* | 10/2014 | Bhargava | G06F 16/219 707/648 |
| 9,189,125 | B2 | 11/2015 | Taylor et al. | |
| 9,330,131 | B2* | 5/2016 | Hosey | G06F 16/2365 |
| 9,430,229 | B1* | 8/2016 | Van Zijst | G06F 9/3844 |
| 9,535,664 | B1* | 1/2017 | Foster | G06F 8/427 |
| 9,575,764 | B1* | 2/2017 | Turner | G06F 3/14 |
| 9,652,485 | B1* | 5/2017 | Bhargava | G06F 16/2379 |
| 10,042,637 | B1* | 8/2018 | Foster | G06F 8/48 |
| 10,204,112 | B1* | 2/2019 | Bhargava | G06F 16/2329 |
| 10,289,407 | B1* | 5/2019 | Turner | G06F 9/3844 |
| 10,698,682 | B1* | 6/2020 | Foster | G06F 8/427 |
| 10,915,316 | B1* | 2/2021 | Turner | G06F 9/3844 |
| 10,943,056 | B1 | 3/2021 | Markey et al. | |
| 11,080,043 | B1* | 8/2021 | Look | G06F 21/53 |
| 11,113,264 | B2* | 9/2021 | Rittinger | G06F 16/2365 |
| 11,294,665 | B1* | 4/2022 | Foster | G06F 8/71 |
| 11,294,666 | B1* | 4/2022 | Look | G06F 8/71 |
| 11,334,644 | B2* | 5/2022 | Jerdonek | G06F 16/958 |
| 11,392,556 | B1* | 7/2022 | Mann | G06F 3/04817 |
| 11,481,288 | B2* | 10/2022 | Haramati | G06F 3/0485 |
| 2003/0237048 | A1* | 12/2003 | Jones | G06F 40/143 715/255 |
| 2004/0230886 | A1* | 11/2004 | Livshits | G06F 8/71 715/229 |
| 2004/0260974 | A1* | 12/2004 | Livshits | G06F 8/71 714/19 |
| 2005/0108189 | A1 | 5/2005 | Samsonov | |
| 2006/0123033 | A1* | 6/2006 | Livshits | G06F 40/194 |
| 2006/0161516 | A1* | 7/2006 | Clarke | G06Q 10/10 |
| 2006/0161585 | A1* | 7/2006 | Clarke | G06F 40/197 709/227 |
| 2006/0225040 | A1* | 10/2006 | Waddington | G06F 8/71 717/122 |
| 2006/0288054 | A1* | 12/2006 | Johnson | G06F 8/61 707/999.203 |
| 2007/0283321 | A1* | 12/2007 | Hegde | G06F 8/71 717/110 |
| 2008/0024802 | A1* | 1/2008 | Kato | G06F 3/1246 358/1.9 |
| 2009/0006936 | A1* | 1/2009 | Parker | H04L 12/1813 715/200 |
| 2009/0150906 | A1 | 6/2009 | Schmidt et al. | |
| 2009/0157490 | A1* | 6/2009 | Lawyer | G06F 16/00 707/999.005 |
| 2009/0157491 | A1* | 6/2009 | Brougher | G06Q 30/0273 705/14.69 |
| 2009/0157608 | A1* | 6/2009 | Strathearn | G06F 16/40 707/999.102 |
| 2009/0157667 | A1* | 6/2009 | Brougher | G06F 16/25 707/999.005 |
| 2010/0306273 | A1 | 12/2010 | Branigan et al. | |
| 2011/0047156 | A1 | 2/2011 | Knight et al. | |
| 2012/0330944 | A1 | 12/2012 | Vailaya et al. | |
| 2013/0185252 | A1* | 7/2013 | Palmucci | G06F 16/93 707/608 |
| 2014/0032529 | A1 | 1/2014 | Chang | |
| 2014/0149361 | A1* | 5/2014 | Hosey | G06F 16/2365 707/690 |
| 2016/0055196 | A1* | 2/2016 | Collins | G06F 16/93 707/690 |
| 2016/0232143 | A1 | 8/2016 | Fickenscher et al. | |
| 2016/0275180 | A1 | 9/2016 | Matskevich | |
| 2016/0328470 | A1 | 11/2016 | Indeck et al. | |
| 2017/0364594 | A1 | 12/2017 | Chen et al. | |
| 2018/0349332 | A1 | 12/2018 | Indenbom et al. | |
| 2019/0332699 | A1* | 10/2019 | Rittinger | G06F 16/252 |
| 2021/0073313 | A1* | 3/2021 | Jerdonek | G06F 16/986 |
| 2021/0382711 | A1* | 12/2021 | Look | G06F 21/53 |
| 2022/0164672 | A1* | 5/2022 | Bird | G06N 7/01 |
| 2022/0222461 | A1* | 7/2022 | Mann | H04L 63/105 |
| 2022/0222625 | A1* | 7/2022 | Haramati | G06F 3/04847 |

OTHER PUBLICATIONS

D. Bhagwat et al., "Content-based document routing and index partitioning for scalable similarity-based searches in a large corpus," Conference: Proceedings of the 13th ACM SIGKDD International Conference on Knowledge Discovery and Data Mining, San Jose, California, USA, Aug. 12-15, 2007.

* cited by examiner

Counterparty Signer Name*
John Doe

Counterparty Signer Email*
Person@email.com

Master Agreement Date*
11/11/2019

Smart Detect: The above element may have changed from "December 5, 2019" to "November 11, 2019."

Service Name 1*
Workflow Designer

Smart Detect: The above element may have changed from "Blueprint" to "Workflow Designer."

Addendum Effective Date*
12/05/2019

Updating this information will reset any approvals and notify reviewers that information has been updated.

Comment*
Corrects information

Cancel    Update 510

SMART DETECTION OF AND TEMPLATES FOR CONTRACT EDITS IN A WORKFLOW

CROSS REFERENCE TO RELATED APPLICATIONS

This application is a continuation of U.S. patent application Ser. No. 17/505,470, entitled SMART DETECTION OF AND TEMPLATES FOR CONTRACT EDITS IN A WORKFLOW (now U.S. Pat. No. 11,880,650), which is related to and claims priority under 35 USC § 1.119(e) to U.S. Provisional Patent Application No. 63/105,764, entitled SMART TEMPLATES FOR EDITING CONTRACT WORKFLOWS, and to U.S. Provisional Patent Application No. 63/105,784, entitled SMART DETECTION OF CONTRACT EDITS IN A WORKFLOW, both filed on Oct. 26, 2020. The contents of the above-identified application Ser. No. 17/505,470, Application No. 63/105,764, and Application No. 63/105,784 are incorporated herein by reference, in their entireties, and for all purposes.

TECHNICAL FIELD

The present disclosure generally relates to detecting changes to uploaded documents in a workflow platform, such as uploaded contracts on a smart contract platform.

BACKGROUND

Smart contract platforms may enable different parties (e.g., negotiating parties) to collaborate and edit contractual documentation remotely and asynchronously. More specifically, platforms may detect and display edits of contracts to at least a controlling party to the contract. Current platforms for providing collective work on a media file (e.g., a contract contained in a text editing application, a text file, a spreadsheet file, etc.) lack a simple mechanism to incorporate edits from one or more parties into a specific workflow. Typically, a controlling party (e.g., project manager or contract provider) completes the collective work by manually accepting or rejecting the edits, making sure that a regulation or technical standard is maintained throughout the document. This process is slow and exposed to human error, especially when the person in control is not experienced in the technicalities of the document at hand, or simply makes an error. To detect and correct errors, the controlling party often reviews the document by hand, which takes time and is not always reliable. Platforms that better detect changes to uploaded documents may enhance a user experience with respect to template generated media files and/or media files that may involve unanticipated change to media files being edited by multiple parties.

BRIEF SUMMARY

The present disclosure provides for systems and methods for detecting changes to uploaded media files in a workflow platform, such as uploaded contract documents on a smart contract platform. In an aspect, a template element is provided to automatically generate portions of a media file. For example, a user may use the template element to automatically generate legal language in the media file. The automatically generated legal language may be regenerated to incorporate unanticipated changes between different instances (e.g., versions) of the media file that were changed by one or more other users. As an example, the unanticipated changes may be reflected in fields or form sections of the template element as well as in a draft or version of the media file generated via the template element. The unanticipated changes may be freeform changes to the media file that are reflected in the template element. Moreover, the template element can include a feature that indicates when freeform changes may have changed field inputs previously input into the form section of the template element for the media file. The freeform changes may be conflicting if separately made by multiple users. The template element may also implement an algorithm (e.g., heuristic) or user prompt that may be used to resolve conflicting edits made by two or more different users to different versions of the media file.

According to one embodiment of the present disclosure, a computer-implemented method for detecting changes to uploaded documents in a workflow platform is provided. The method includes selecting a key portion of a media file. The method also includes inserting a first marker before the key portion of the media file and a second marker after the key portion of the media file. The method also includes generating, based on an input from a client device, a merged media file comprising a combination of a first edited version of the media file and a second edited version of the media file. The method also includes determining, in a portion of the merged media file corresponding to the key portion of the media file, a conflict between the first edited version of the media file and the second edited version of the media file. The method also includes updating, based on the merged media file, a location of at least one of the first marker or the second marker. The method also includes saving a marker branch version of the media file indicating a change in the location of at least one of the first marker or the second marker. The method also includes sending a prompt to the client device to select, for the conflict, a conflict resolution option of a plurality of conflict resolution options.

According to one embodiment of the present disclosure, a system is provided including a processor and a memory comprising instructions stored thereon, which when executed by the processor, causes the processor to perform a method for detecting changes to uploaded documents in a workflow platform. The method includes selecting a key portion of a media file. The method also includes inserting a first marker before the key portion of the media file and a second marker after the key portion of the media file. The method also includes generating, based on an input from a client device, a merged media file comprising a combination of a first edited version of the media file and a second edited version of the media file. The method also includes determining, in a portion of the merged media file corresponding to the key portion of the media file, a conflict between the first edited version of the media file and the second edited version of the media file. The method also includes updating, based on the merged media file, a location of at least one of the first marker or the second marker. The method also includes saving a marker branch version of the media file indicating a change in the location of at least one of the first marker or the second marker. The method also includes sending a prompt to the client device to select, for the conflict, a conflict resolution option of a plurality of conflict resolution options.

According to one embodiment of the present disclosure, a non-transitory computer-readable storage medium is provided including instructions (e.g., stored sequences of instructions) that, when executed by a processor, cause the processor to perform a method for detecting changes to uploaded documents in a workflow platform. The method includes selecting a key portion of a media file. The method also includes inserting a first marker before the key portion of the media file and a second marker after the key portion of the media file. The method also includes generating, based on an input from a client device, a merged media file comprising a combination of a first edited version of the media file and a second edited version of the media file. The method also includes determining, in a portion of the merged media file corresponding to the key portion of the media file, a conflict between the first edited version of the media file and the second edited version of the media file. The method also includes updating, based on the merged media file, a location of at least one of the first marker or the second marker. The method also includes saving a marker branch version of the media file indicating a change in the location of at least one of the first marker or the second marker. The method also includes sending a prompt to the client device to select, for the conflict, a conflict resolution option of a plurality of conflict resolution options.

According to one embodiment of the present disclosure, a system is provided that includes means for storing instructions, and means for executing the stored instructions that, when executed by the means, cause the means to perform a method for detecting changes to uploaded documents in a workflow platform. The method includes selecting a key portion of a media file. The method also includes inserting a first marker before the key portion of the media file and a second marker after the key portion of the media file. The method also includes generating, based on an input from a client device, a merged media file comprising a combination of a first edited version of the media file and a second edited version of the media file. The method also includes determining, in a portion of the merged media file corresponding to the key portion of the media file, a conflict between the first edited version of the media file and the second edited version of the media file. The method also includes updating, based on the merged media file, a location of at least one of the first marker or the second marker. The method also includes saving a marker branch version of the media file indicating a change in the location of at least one of the first marker or the second marker. The method also includes determining, based on the change in the location of the at least one of the first marker or the second marker, a change in an attribute of the media file. The method also includes updating, based on the change in the attribute, a media file template. The method also includes determining that the conflict comprises an edit from the first edited version of the media file that applies to the portion of the merged media file. The method also includes sending a prompt to the client device to select, for the conflict, a conflict resolution option of a plurality of conflict resolution options.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 5 illustrates a template element including an indication of field inputs previously input into a form section that has changed between different versions of a media file, according to certain aspects of the present disclosure.

Figure 1:
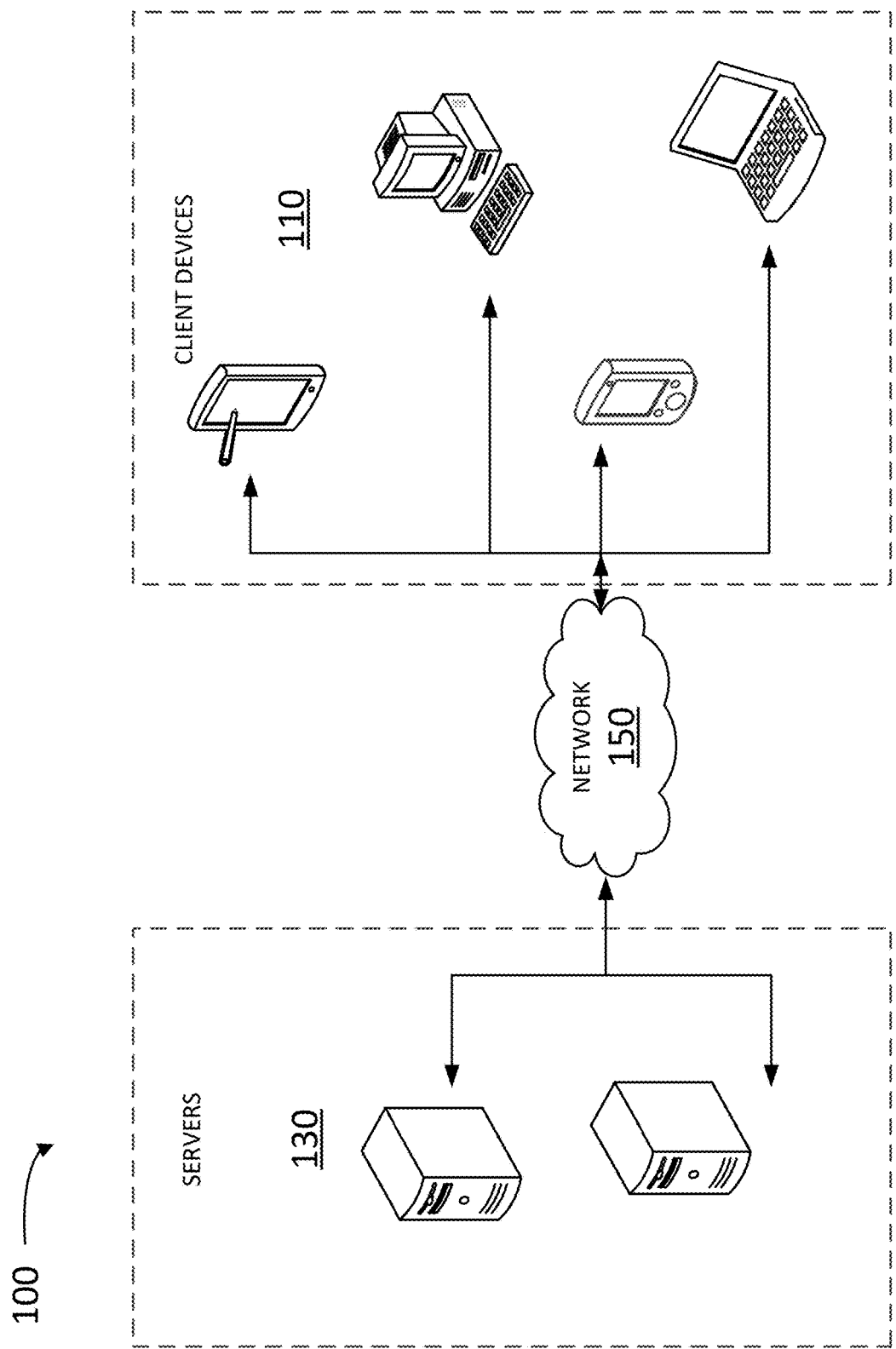
FIG. 1 is a block diagram of a device operating environment with which aspects of the present disclosure can be implemented.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art, that embodiments of the present disclosure may be practiced without some of these specific details. In other instances, well-known structures and techniques have not been shown in detail so as not to obscure the disclosure.

General Overview

In smart contract platforms and other network applications where media files are edited asynchronously by multiple parties, platforms (e.g., networking platforms, workflow platforms, contract platforms, and/or the like) used by the parties may create confusion such as confusion about which version of a media file is circulating amongst some of the parties, which version is the most updated and legitimate version, which version is stored in a database, and/or the like. As used herein, the media file may be a document, a contract document, a text media file, a spreadsheet, and/or the like. Moreover, in some embodiments, one of the parties may introduce edits that are not consistent with the legal, syntactic, or otherwise technical aspects of the media file. As an example, such as edits may be inconsistent with or alter template language corresponding to a template element provided by a workflow platform for the media file.

The workflow platform may use markers, such as text markers or comment markers, to indicate differences between different versions of the media file that are uploaded or managed by the workflow platform. The markers may be tags, comments, and/or the like that are added to the media file as part of a pre-processing process. The markers may delineate one or more key portions of the media file. After executing a three way merge of two versions of the media file with a common ancestor, a post-processing process may be performed by the workflow platform to determine the location of the markers (e.g., an updated/new location relative to where the markers were located during pre-processing). The determined location of the markers may indicate differences between various versions of the media file. For example, the indicated differences may be between version A and version B of the media file which may be inputs in a three way merge with the common ancestor to generate a merged version of the media file. As an example, the form sections of the template element can indicate differences introduced to the media file by free form changes, such as by displaying the differences next to a corresponding form section. A template format of the template element may be dynamically updated based on updates of the markers between different versions of the media file.

When the media file is edited asynchronously, conflict between edits may cause issues such as conflicting or inconsistent portions of the merged version of the media file. However, a controlling party may need to access the multiple edits by hand and adapt all the changes to a strict technical specification (e.g., legal terms and regulations, and the like). The present disclosure provides mechanisms to display where conflicting edits occur in the merged media file and/or to select conflict resolution options. The disclosed system addresses this asynchronous editing conflict problem specifically arising in the realm of computer technology, by providing a solution also rooted in computer technology. A platform, as disclosed herein, enhances the power of a workflow and may be used to enhance edits performed via a template-based, but open to negotiation, contract. For example, the platform may determine how to highlight a comment made or particular text edited in a portion of version A (e.g., where to locate the comment or particular text in the merged version of version A and version B) when the corresponding portion of version A is edited in version B. As an example, the platform may determine, for merging of the media file, how to apply annotations from a paragraph made in one version of the media file when the same paragraph is different (e.g., edited) in another version of the media file. In some embodiments, a platform, as disclosed herein, may enhance other technologies applied to contracts and a text editing application.

In a workflow platform as disclosed herein, a contract template element of the media file can convert form information into legal language, encoding variable information (counterparty names, dates, and the like) or fallback provisions (e.g., conditional clauses). When contracts are negotiated or edited in unanticipated ways (e.g., by either one of the subscribing parties, asynchronously), it is desirable to update form information accordingly and to regenerate relevant contract language. Thus, the contract template element may be updated based on the asynchronous edits/differences indicated by the markers. In some situations, the asynchronous editing may result in conflicting edits between different asynchronously edited versions of the media file. The workflow platform may provide conflict resolution options to resolve the conflicting edits. For example, an algorithm or heuristic may be applied to resolve the conflicting edits when merging the different asynchronously edited versions. For example, a particular user or client device may be prompted to select one of a plurality of offered conflict resolution options, such as different approaches for merging conflicting edits or comments.

Example System Architecture

FIG. 1 is a block diagram of a device operating environment with which aspects of the present disclosure can be implemented. FIG. 1 illustrates an exemplary network architecture 100 to provide a workflow platform (e.g., smart contract workflow) to handle asynchronous edits from multiple parties, according to some embodiments. The network architecture includes a client device 110 and one or more servers 130 which are communicatively coupled through a network 150. The client device 110 may be any one of a mobile device, a laptop, a desktop, a palm or pad device, and/or the like. The client device 110 can be controlled by a user or client to edit a media file uploaded to or managed by the workflow platform. Multiple client devices 110 may have access to the workflow platform hosted by the servers 130. Each of the servers 130 may be a computing device such as a workstation, including one or more desktop computers or panels mounted on racks, and the like. The panels may include processing boards and also switchboards, routers, and other network devices. The network 150 may include a wired network (e.g., via fiber optic or copper wire, telephone lines, and the like) or wireless network (e.g., a cellular network, radio-frequency (RF) network, Wi-Fi, Bluetooth, and the like).

Each of the multiple client devices 110 may represent or correspond to one of the multiple parties. As an example, the media file may be a contract that the multiple parties are negotiating. As a result, each of the multiple parties can edit one or more versions of the media file asynchronously. As discussed above, the media file may be a document, a contract document, a text media file, a spreadsheet, and/or the like. If conflicting edits result from the asynchronous editing of the media file, the workflow platform may execute an algorithm to determine how to resolve the conflicting edits. For example, the workflow platform may execute the algorithm to determine respective priorities of comments, edits, and/or annotations made by the respective negotiating parties for insertion into a merged version of asynchronously edited versions of the media file. As an example, the workflow platform may send prompts to one or more of the multiple parties to select one of a plurality of conflict resolution options to resolve the conflicting edits. One (or a subset) of the multiple parties can be considered the controlling party such that only the one or the subset receives a prompt to select a conflict resolution option.

Figure 2:
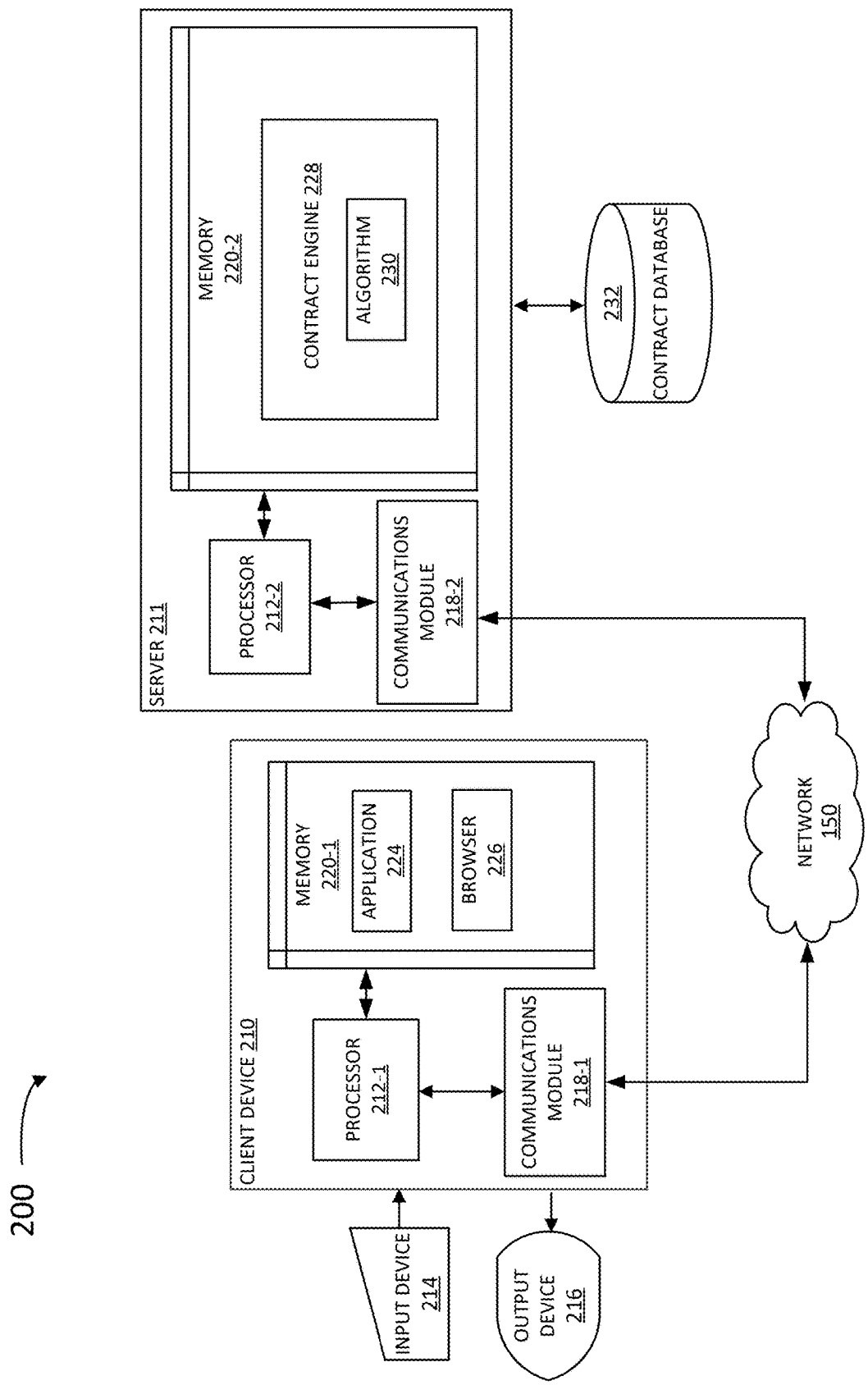
FIG. 2 is a block diagram of an example workflow platform for managing media files, according to certain aspects of the present disclosure.

FIG. 2 is a block diagram 200 of an example workflow platform for managing media files, according to certain aspects of the present disclosure. FIG. 2 illustrates a client device 210 and a server 211 for use in the network architecture of FIG. 1, according to some embodiments. The client device 210 may be similar to client device 110 and the server 211 may be similar to one of the servers 130. Each of one or more client devices 210 and one or more servers 211 may access each other and other devices in the network 150 via corresponding communications modules 218-1, 218-2. The communications modules 218-1, 218-2 may each include radio hardware and software such as RF antennas, analog circuitry, digital to analog conversion circuits, digital signal processing circuitry, and/or the like. In some embodiments, each client device 210 or server 211 may be coupled to at least one input device 214 and an output device 216. The input device 214 may include a mouse, a keyboard, a pointer, a stylus, a touchscreen display, and a microphone. The output device 216 may include a display (e.g., the same touchscreen display as the input device), a speaker, an alarm, and the like.

Generally, the client device 210 and the server 211 are computing devices including at least: a memory 220-1, 220-2 storing instructions and a processor 212-1, 212-2 configured to execute the instructions to perform, at least partially, one or more steps as described in methods disclosed herein. For example, the memory 220-1 of the client device 210 may include a browser 226 and a network application 224 hosted by the server 211. In some embodiments, the memory 220-1 in the client device 210 may also include a media file editing or document editing application (e.g., a text editor, a document database application, a slide presentation application, or a graphics editing application). The browser 226 or the network application 224 may include commands for accessing a workflow platform (e.g., smart contract platform) hosted by a contract engine 228 stored in a memory 220-2 of the server 211. Further, the browser 226 or network application 224 may be configured to display a contract dashboard for a user of the client device 210, upon access of a smart contract in the contract engine of the server. The user of the client device 210 may use a template element of the contract dashboard to generate versions of a media file (e.g., negotiated contract) and/or the contract dashboard to select one of a plurality of conflict resolution options when conflicting edits between different versions of the media file occur.

The contract dashboard may include multiple visual features and actionable icons and buttons that enable a party to review, edit, approve, or reject a media file or contract in the smart contract platform. The user of the client device 210 may also send the contract or at least, a version of the contract to a second party to the contract, via the network 150. In that regard, at least one or more versions of the contract may be stored in the memory 220-1 of the client device 210, in the memory 220-2 of the server 211, or in a contract database communicatively coupled to the server 211 and the client device 210 through the network 150. The application in the client device 210 may also include a document editing tool (e.g., a text editing application, and the like) configured to edit text versions of a contract or any other technical document. The document editing application may be configured to include markup text indicating edits and other modifications made in a document by the user of the client device 210 (e.g., a party to a legal contract). Accordingly, different parties in a contract may edit the document asynchronously (e.g., during the course of a contract negotiation). The markup text may be added based on determining differences from the asynchronous editing via markers or tags added to the document prior to performing a three way merge. As used herein, a three way merge can refer to merging the result of a difference analysis between a media file A and media file B with respect to a base common ancestor media file C of both media file A and media file B. In this way, the three way merge can be performed to merge changes of two different edited media file versions relative to an original copy (e.g., the base common ancestor media file).

The server 211 may include a host for a smart contract platform. The host for the smart contract platform may include, in its memory 220-2, a contract engine 228 configured to support the smart contract platform. The contract engine 228 includes multiple instructions for execution by the processors 212-1, 212-2, and at least some of the instructions may be part of an algorithm (e.g., conflict resolution algorithm) or code that includes mathematical and logical operations. The algorithm may include a non-linear algorithm such as a neural network, an artificial intelligence or machine learning algorithm, a natural language processing (NLP) algorithm, a linear or multilinear regression algorithm, or a deterministic algorithm and is configured to resolve specific tasks according to a previous training using a carefully selected sampling universe. Some of the tasks for which the algorithm is trained may include semantic and syntax interpretation of a text, comparison between text documents, and/or correlating a text with a legal code to ensure that the text is consistent and complies with certain aspects of the legal code. In some embodiments, the algorithm may also include an encryption code configured to provide certificates, keys, and signatures to multiple users. The algorithm may be configured to authenticate the certificates or signatures in documents returned by users, so that any tampering with the document or any unauthorized access may be identified and avoided.

In some embodiments, a server 211 as disclosed herein may also include a media file editing or a document editing platform (e.g., a text editor) providing communication functionality between multiple client devices 210 in the network 150. The media files or contract files may be stored in a contract database 232 that is accessible by the server 211. For example, the contract database 232 can store various versions of media files or contracts as well as merged versions of various version instances. As an example, a merged version of a negotiated contract can be a combination of an asynchronously edited version 1 of a template edited by a first contracting party and another asynchronously edited version 2 of the same template edited by a second contracting party.

The contract engine 228 hosting the application in the client device may include several tools. For example, the tools may include a template document generation tool that generates a media file (e.g., a.docx file), based on a template media file and a set of attributes. The template document generation tool may be a template element of the workflow platform that includes form sections. A field value may be input by a user via a client device 210 to generate the template media file that is populated with field input values (e.g., metadata) in portions of the template media file that correspond to the form sections. A media file generation display of the template element may include all of the fillable form sections. The media file generation display may also indicate when a portion of a multiparty edited media file corresponding to one or more of the form sections has been asynchronously edited by one of the multiple parties.

The tools may also include a media file compare tool (e.g., red-lining of .docx documents) that compares two media files, producing a file with the changes encoded as tracked changes. For example, the two media files may be a first edited version and a second edited version of the same original media file (e.g., an original media file generated from the template element). The encoded changes may be determined based on inserted markers or tags. If the encoded changes reflect a potential conflict, a conflict resolution algorithm may be executed or the server 211 may send a prompt to an appropriate device 210 for input on how to resolve the potential conflict. The tools may also include an accept changes tool that accepts all, or a selected set of tracked changes in the media file. For example, a user of a client device 210 may accept a version of the media file that is encoded with track changes from another device 210. As an example, if the track changes are part of a contract negotiation, the user may use the accept changes tool to accept a negotiated version of the media file.

Another tool of the contract engine 228 can include a merge tool that merges two media files with tracked changes. In some embodiments, the merge tool verifies that the two media files originate from the same original media file. The merge tool may produce a merged media file with tracked changes. For example, the merge tool may generate a merged version of the media file based on a three way merge of the two media files with a common ancestor. For example, the two media files may be two different asynchronously edited versions of the same original media file (common ancestor). The merge tool may monitor changes indicated by inserted markers relative to a master branch and a markers branch for merging various versions of the original media file. User input from various client devices 210 may be received as part of generating the merged version via the merge tool. As an example, the user input may be received to determine how conflicting edits from the two media files being merged together should be handled.

Other tools of the contract engine 228 may include a side-by-side media file editing tool, a clause review playbook tool, a third party edit information tool, and/or the like. The side-by-side media file editing tool may be configured to enable concurrent editing by multiple client devices 210. As an example, two or more client devices could edit different versions of the original media file in side-by-side screens simultaneously. In this way, document and metadata edits corresponding to the simultaneously edited versions may flow between the side-by-side screens. That is, edits from one screen may be reflected by another screen of the screens while side-by-side screen editing is occurring. The disjunctive changes being made in different screens of the side-by-side screens can be indicated by the track changes determined via the marker and updated template element. The clause review playbook tool can be used by one or more multiple client devices 210 to mark clauses in the original media file. As different versions of the original media file are created, the marked clauses in the original media file may be tracked to corresponding (e.g., new, moved, etc.) locations in different edited versions of the original media file. An algorithm 230 (e.g., machine learning algorithm) can be used to flag or indicate when there is an update or change to the marked clauses in subsequent edited versions. The third party edit information tool may provide a user interface for third parties (e.g., using third party client devices) to mark or specify fields/portions of the original or edited media file to track.

Example Workflow Platform Functionality

Figure 3:
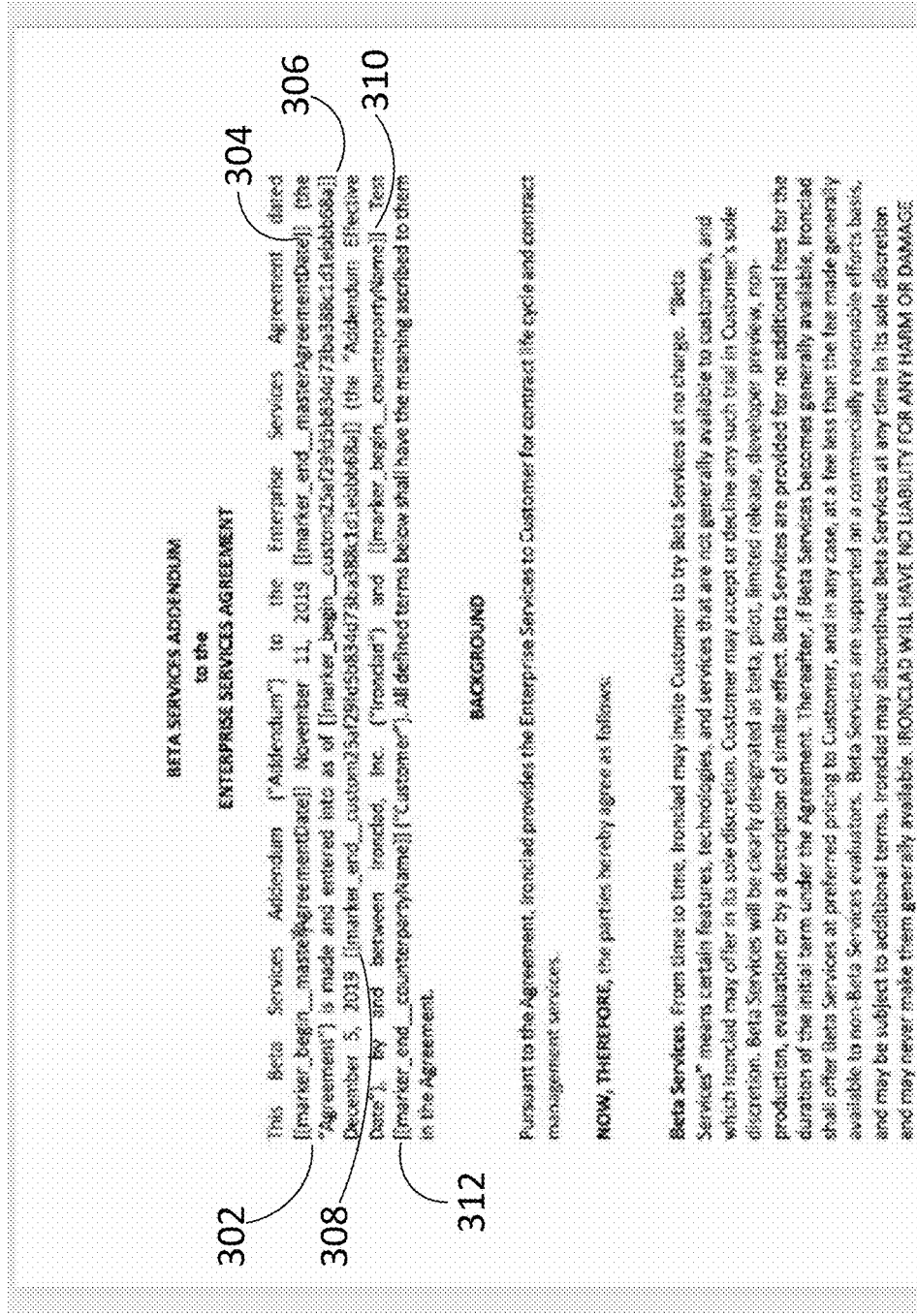
FIG. 3 illustrates a version of a media file including markers for indicating differences within portions of the media file, according to certain aspects of the present disclosure.

FIG. 3 illustrates a version of a media file including markers for indicating differences within portions of the media file, according to certain aspects of the present disclosure. FIG. 3 includes an example image 300 of a portion of a media file. The media file can be rendered as part of an application for a workflow platform to control and manage editing of the media file, such as asynchronous editing by multiple parties during negotiation of a final version of the media file. The example image 300 illustrates that the media file includes markers (e.g., comments, tags, etc.) to identify edits and changes to a document, according to some embodiments. For example, the workflow platform can insert markers before and after key points in a media file (e.g., document, a contract document, a text media file, a spreadsheet, etc.), such as a key portion of the media file. That is, sets of markers may delineate key portions of the media file such as by inserting a first marker 302, 306, 310 before a key portion of the media file and a second marker 304, 308, 312 after the key point of the media file.

The first markers 302, 306, 310 may be beginning markers while the second markers 304, 308, 312 may be ending markers. The markers can have identifiers, such as identifiers that correspond to a particular form section of a template element of the workflow platform. As an example, a set of the first marker 302 and the second marker 304 may be identified by master agreement data, which can correspond to a master agreement date form section of the template element which can receive an appropriate agreement date field input value (e.g., metadata value). The markers 302, 304 inserted into the media file can indicate the bounds of the "master agreement date" field ("[[marker_begin_masterAgreementDate]]" and "[[marker_end_masterAgreementDate]]"), which can be a field corresponding to a form section of the template element. As an example, a set of the first marker 306 and the second marker 308 may be identified by a custom edit data, which can correspond to a free form edit of the media file (e.g., without reference to template element). The markers 306, 308 inserted into the media file can indicate the bounds of the "custom" field ("[[marker_begin_custom25af29fd5b834d73ba388cldlebbb68a]]" and "[[marker_end_custom25af29fd5b834d73ba388cldlebbb68a]]"), which can be a freeform custom field that is not part of the template element.

Alternatively, the freeform edit may result in creation of the above identified custom field, such as an "addendum agreement date" field for a corresponding form section of the template element. As an example, a set of the first marker 310 and the second marker 312 may be identified by counterparty name data, which can correspond to a counterparty name form section of the template element, which can receive an appropriate counterparty name field input value. The markers 310, 312 inserted into the media file can indicate the bounds of the "counterparty name" field ("[[marker_begin_counterpartyName]]" and "[[marker_end_coutnerpartyName]]"), which can be a field corresponding to a form section of the template element. A user (e.g., a user using one of the client devices 110, 210) may accept one or more changes to the media file indicated by markers in a version of the media file, such as via an accept changes tool. For example, the user may use the accept changes tool to accept changes to the master agreement date indicated by the first marker 302 and the second marker 304 after a three way merge of two different versions of the media file is performed. That is, the markers may be inserted as part of a pre-processing process, prior to performing a three way merge and a post-processing process.

The three way merge and/or media file merge change function may be performed by the workflow platform such as via the merge tool of the contract engine 228. The merge changes tool can update the markers' locations when the media file updates. Once the markers have been updated, the contract engine 228 can perform the post-processing to flag areas where changes appear between markers. For example, the post-processing may be performed to determine a new location of the markers after the three way merge is performed. The contract engine 228 can also perform the post-processing to determine a new location of metadata of the media file. As an example, a paragraph of the media file may be moved or deleted such that the master agreement date may be changed to a different type of agreement date or deleted altogether. In this situation, the change to the agreement date metadata may cause the workflow platform to update the master agreement date form section of the template element to the different type of agreement date or delete the form section altogether. The markers being updated may be invisible to the multiple parties. For example, the media file compare tool may generate a compare version of the media file with the first markers 302, 306, 310 and the second markers 304, 308, 312 not being visible to at least one of the parties of the multiple parties.

The media file compare tool may generate a red-lined version of the media file based on differences between two different versions of the media file, which may be determined by the workflow platform using markers such as the first markers 302, 306, 310 and the second markers 304, 308, 312. The markers may be configured to indicate a beginning and an end of a conflicting portion of the media file. For example, the workflow platform may post-process the first marker 302 and the second marker 304 to determine that version A of the media file includes an edit that changes the master agreement date to Nov. 1, 2019 and that version B of the media file includes an edit deleting the sentence that specifies the master agreement date. As such, the workflow platform may indicate that there are conflicting edits regarding the master agreement date relative to a common ancestor (e.g., the original media file that version A and version B edited). The conflicting edit may be resolved via an algorithm or a conflict resolution option selected by the user. Versions of the media file having inserted markers may be part of a markers branch that can be maintained in parallel with a master branch. When changes or resolved conflicting edits are determined, those changes may be merged from the master branch to a corresponding marker branch of the markers branch.

Figure 4:
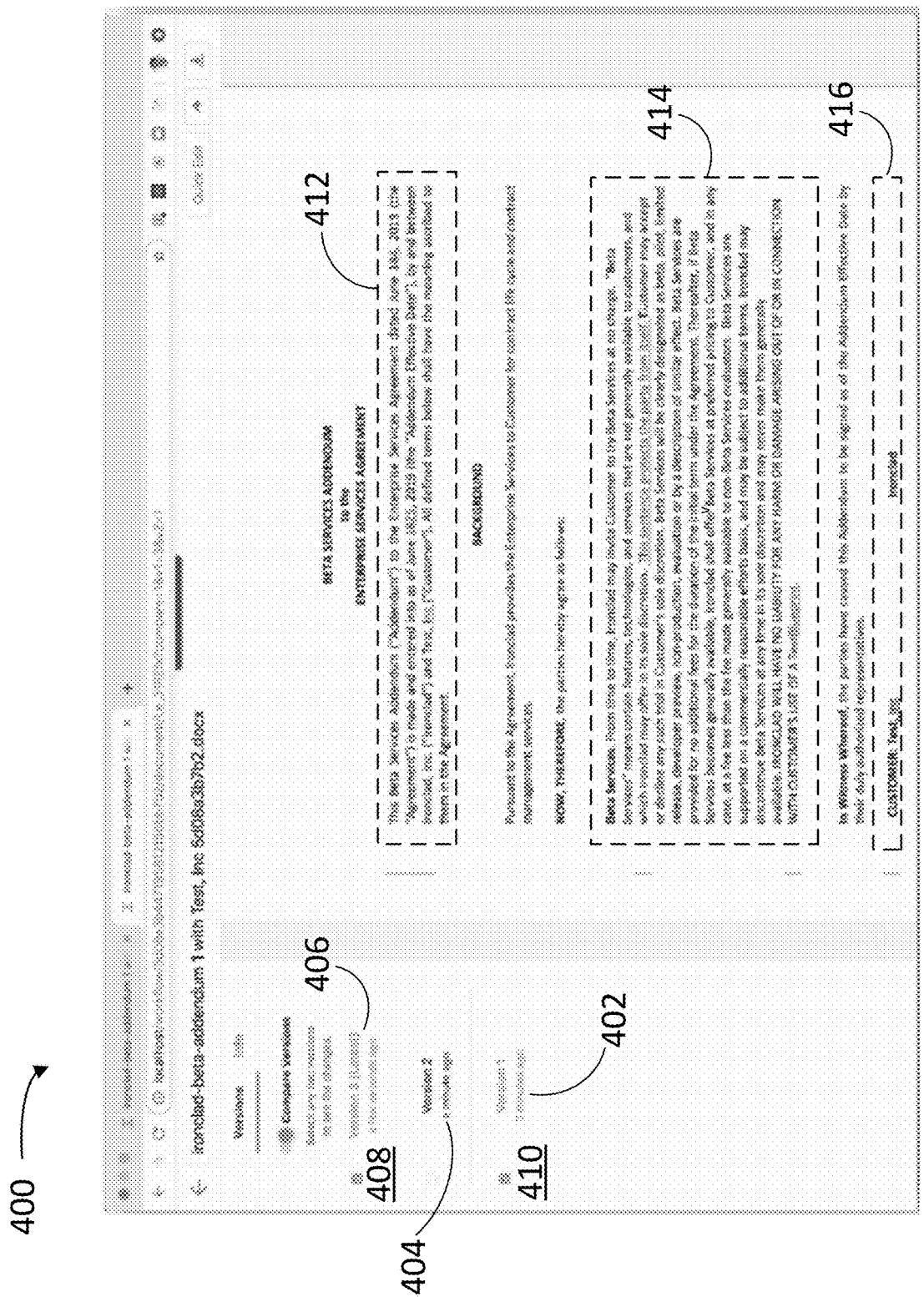
FIG. 4 illustrates a version of a media file including markers for indicating differences between different versions of the media file, according to certain aspects of the present disclosure.

FIG. 4 illustrates a version of a media file including markers for indicating differences between different versions of the media file, according to certain aspects of the present disclosure. FIG. 4 illustrates an example image 400 of an application for a workflow platform illustrating one version of a media file with detected edits. As an example, the application may display a side-by-side media file editing tool (e.g., a side-by-side edit doc and info tool) for pairing incorporated changes to the media file and detecting changes that correspond to form sections of a template element of the workflow platform. This can provide a side-by-side editing experience, where document edits and metadata edits could flow between the side-by-side screens. The side-by-side media file editing tool may include a graphical interface which may be used to select different versions of the media file. The graphical interface can show representations 402, 404, 406 of different versions, including representation 402 for version 1, representation 404 for version 2, representation 406 for version 3, and/or the like. The graphical interface may indicate a quantity of the different versions and when versions were updated. The graphical interface can indicate that version 1 was updated two minutes ago, version 2 was updated a minute ago, version 3 was updated a few second ago, and/or the like, for example.

The graphical interface may comprise check boxes 408, 410. A user may use a client device (e.g., client device 110, 210) to select one or more of the versions of the different versions of the media file. The user may click multiple versions of the different versions for comparison, such as via the media file compare tool, which can be activated using a slide bar icon on the graphical interface. The media file compare tool may generate a red-lined merged file, such as a merged media file from a three way merge of version 1 and version 3 of the media file with a common ancestor. The common ancestor can be an original media file generated via a template element of the workflow platform. The generated red-lined merged file may include changes encoded as tracked changes at sections 412, 414, 416. As an example, the addendum date can be changed from June 18 to June 4 and an ", Inc." can be added at section 412. As an example, the sentence "this sentence protects the party from itself" can be added and "Test" may be switched to "Blueprint" at section 414. As an example, an ", Inc." can be added at section 416.

In this way, the media file compare tool can be used by the user to view changes between various combinations of versions, such as version 1 and version 2, version 1 and version 3, version 2 and version 3, and/or the like. The media file compare tool can indicate changes resulting from changes to metadata specified via the template element as well as freeform edits to the media file. For example, a freeform edit can occur based on one party of multiple parties negotiating the media file making a freeform edit via a reply to an email containing a version of the media file. The reply can include a separately attached edit that was made without using the template element of the workflow platform. For example, a freeform edit may refer to a direct edit to the media file made without usage of a form section of the template element. The workflow platform may automatically merge those freeform edits into a new or subsequent version of the media file. For example, the freeform edits may be new enterprise service features that are being added to a contract document such that the template element of the workflow platform can edit or add new form sections corresponding to the new features.

The workflow platform may also merge edits to the media file made via a change to a form section of the template element. As an example, the user can change the metadata input of "Test" at the "Counterparty Name" form section of the template element to "Test, Inc." which can be reflected as a change at section 412. The differences between version 1 and version 2 occurring at various portions of the media file can be detected by processing markers (e.g., previously inserted into the original media file) after performing the three way merge. Such processing may involve comparing unmarked versions of the media file with marked versions of the media file. The processing may also include post-processing to indicate which parties are authors of which edits or changes made to the media file. For example, a character "<" may be used to indicate that the author of the corresponding edit is party A editing in version A. The "<" can be marked as a deleted character to indicate (e.g., in tracked changes) the beginning of an edit from version A relative to the original media file. For example, a character "|" may be used to indicate that the author of the corresponding edit is party B editing in version B. The "|" can be marked as a deleted character to indicate (e.g., in tracked changes) the beginning of an edit from version B relative to the original media file.

The post-processing may be performed to indicate conflicts, such as conflicting changes made in version A or version B relative to each other. The characters "<" and "|" may be used as text deletion markers to indicate where the conflicts occurs. As an example, for a particular conflict, the characters "<" and "|" may mark the beginning of the conflict relative to the beginning of an edit for version A and version B, respectively. The character ">" may be used to mark the end of the conflict and may be indicated to be authored by "conflict end." As an example, a quantity of an invoice amount may be changed in a sentence in version A while in version B, the entire sentence may be removed in favor of a phrase reciting "see pricing information below." In this example conflict, an algorithm (e.g., heuristic) can be applied to resolve this conflict by selecting a confliction resolution option, such as prioritizing insertion of the edits in version A over version B, inserting both the invoice amount quantity change and the edit adding the "see pricing information below" phrase, and/or the like. The text deletion markers can be part of a user interface for indicating such conflicts.

The algorithm may be a conflict resolution algorithm that involves multiple conflict resolution heuristics. As an example, one or more of the multiple conflict resolution heuristics can be applied to two or more versions of the media file. As an example, the two or more versions may be version A and version B. The multiple conflict resolution heuristics can be applied to "diff A" and "diff B" inputs, which are media files with tracked changes (e.g., inserted text, deleted text, formatted text, etc.) such that rejecting all changes in "diff A" and "diff B" would result in the same media file (a common ancestor base media file). The conflict resolution algorithm may involve iterating through document tree of "diff A" and "diff B" respectively, in a depth-first way, checking whether the conditions of a conflict resolution heuristic are met, and executing the first relevant heuristic. The document tree can include a plurality of nodes.

As an example, the multiple conflict resolution heuristics may include an equivalent changes heuristic, a colliding insertions heuristic, a comment ranges heuristic, conflict non-changes heuristic, and/or the like. The equivalent changes heuristic may involve determining whether "diff A" and "diff B" represent the same change (e.g., same insertion of content, same deletion of content, etc.). If the change is the same, then the heuristic can involve selecting one of "diff A" and "diff B" and progressing to the next node on both document trees. The colliding insertion heuristic may involve determining that "diff A" and "diff B" represent different insertions into the media file. In such a scenario, a conflict can be declared (e.g., label a conflict node) such that a prompt is sent to a user and/or client device 110, 210 to select a conflict resolution option. The conflict resolution options may include accepting a first tracked change insertion from "diff A," accepting a second tracked change insertion from "diff B," accepting a combination of the first tracked change and the second tracked change, selecting an order of the first tracked change and the second tracked change, and/or the like.

The comment ranges heuristic can involve determining whether to insert a comment based on an order. If a comment from one of "diff A" or "diff B" is considered a "comment range start" node, then that node is inserted first prior to considering any other heuristics of the conflict resolution heuristics. In this way, the start of a comment range can expand to include any text of the media file that should reasonably be subject to the start of the comment. If a comment from one of "diff A" or "diff B" is considered a "comment range end" node, then that node is inserted later after considering any other heuristics of the conflict resolution heuristics. In this way, the end of a comment range can be pushed to include any text of the media file that should reasonably be subject to the end of the comment.

The conflict non-changes heuristic may involve incrementally adding track changes to different conflict sides, such as "conflict side A" and "conflict side B" which may include as part of the prompt to the user and/or client device 110, 210 as options. The progression down the nodes of the two document trees may proceed in a conflict mode until two nodes within the two trees are the same type of node. For example, if a "non-change" node occurs in "diff A" and the same type of "non-change" node occurs in "diff B" then the conflict may be concluded. As such, both "conflict side A" and "conflict side B" can be added to the merged media file and the next set of nodes in the document trees can be proceeded to in a non-conflict node. That is, the conflict non-changes heuristic may involve iterating through the conflicting edits (e.g., insertion versus deletions of the same portion of the media file) until all of the edits/conflict nodes are iterated through and the conflict may be declared over to proceed to the non-conflict node.

Additionally or alternatively, the text deletion markers may be included in a redlined version of the media file (e.g., generated via the media file compare tool) as part of a user prompt to one or more of the authors of version A and version B to select a conflict resolution option. Conflicts may be indicated based on processing performed by the workflow platform. For example, the red-lined merged file generated by the media file compare tool may include pre-processing performed before and post-processed performed after performing the three way merge to generate the red-lined merged file from various versions of the media file such as version 1 and version 3. Pre-processing may refer to placement of markers within the media and post-processing may refer to moving markers to a beginning and an end of a particular conflicted area, such as based on the workflow platform pushing markers to the beginnings and ends of the conflicted areas. For example, pushing the markers may be part of a differencing process between master and marker versions of the media file that is modified to detect text additions or removals of the markers themselves. For example, the contract engine 228 can push a begin marker to the beginning of a conflict, and an end marker to the end of the conflict. The post-processing may be performed on a generated .docx difference media file. Some pre-processing and post-processing examples are illustrated in Table I.

TABLE I

| Case | Example Pre-Processing | Example Post-Processing |
|---|---|---|
| Marker and field updates are folded into the same change | . . . between Dolphin and Ironclad.. | . . . between Dolphin and Ironclad.. |
| Spaces are misattributed to beginning or end of marker | . . . on January 5, 2019 every . . . | . . . on January 5, 2019 every . . . |

As indicated by Table I, in pre-processing, a marker and field update (e.g., update to a form section of a template element) can be merged together such that a beginning marker is incorrectly located after a redline change. For example, the beginning marker in the first case of Table I is located after the deleted character "antelope." Accordingly, in post-processing, the beginning marker may be moved or pushed to the beginning of the conflicting area illustrated by the first case. That is, the beginning marker is relocated to a location before the deleted character "antelope." As an example, there may be extra spaces between a set of markers that are misattributed. As illustrated by the second case of Table I, spaces that are initially misattributed to the set of markers may be addressed by moving the beginning and/or ending marker in the second case so that there are no extra spaces (e.g., the beginning and the ending marker are on the same line). As discussed above, conflict may involve markers when performing a three way merge of the versions Vn and Vn' of the media file into a merged version Vn+1 of the media file. Versions Vn and Vn' can differ only in that one version includes markers and the other version does not include markers. In this way, the merged version Vn+1 can include sections 412, 414, 416 to indicate tracked changes and/or conflict areas.

To perform at least a portion of the above operations and functions, the contract engine 228 may include a three-way merge tool and a differencing tool. The differencing tool can compare unmarked Vn and marked Vn' versions of a document including a post-processing operation to avoid/handle conflicts (cf. Table I). The contract engine 228 can also include an incorporate changes tool to keep track of underlying attributes of the media. For example, the attributes may include letters, characters, words, conditional clauses, multiforms, complex formulas and logic, metadata and/or the like. The incorporate changes tool may track when changes to the attributes occur based on freeform edits and/or edits to the template element, for example. The contract engine 228 can also include a detect tool that allows the media file or a version thereof to be uploaded, and then updates the attributes. The detect tool may determine or detect this update of attributes to generate an indication of what edits/changes have been made. As an example, the detect tool may include an indication in proximity to a form section of the template element to indicate that attributes corresponding to the form section have changed (e.g., between a first version and a subsequent version of the media file).

The detect tool may be capable of handling substantial changes to a media file. For example, a substantial change may include deleting a field entirely, uploading an entirely different document, identifying when one or more of the markers end up in completely different places in the document, and/or the like. The detect tool may also be configured to indicate specific ranges of the media file or a version thereof. The detect tool may indicate the specific ranges based on determining a new location in a subsequent version of the media file for a marker inserted into a previous version of the media file or an annotation (e.g., user annotation, etc.) made in the previous version. For example, two or more authors may edit (via suitable user devices) from a common ancestor version of the media such that an author of version A may edit a paragraph within the common ancestor and an author or version B may circle words within the same paragraph. The detect tool may use inserted markers to determine that the circled words should be propagated to a merged version of Version A and Version B. That is, the detect tool may determine how to reproduce the circle annotation even though the words that were circled in version A may no longer be part of the same paragraph in the merged version because author B edited the same paragraph such that the same paragraph in Version B does not have an exact equivalent in the merged version. As an example, the circled words may have a comment associated with them. The detect tool may determine a new location for the associated comment in the merged version based on an assessment of how the paragraph in Version B where the associated comment was originally located has changed relative to the merged version. As an example, the detect tool can be configured to track and indicate a user specified range of text or some other arbitrary range of attributes, comments, and/or the like.

As discussed above, the contract engine 228 may include a clause review playbook tool to mark clauses (e.g., in a contract document) desired to be reviewed. When a selected clause is changed, the clause review playbook tool can flag it for review. The clause review playbook tool may be paired with a machine learning (ML) clause detection tool to detect initial clause boundaries. Accordingly, when a clause is updated in subsequent revisions of the media file, these updates are flagged. The clause review playbook tool may be configured in conjunction with the detect tool to identify new locations of clauses, sentences, comments, and/or the like between an initial revision and subsequent revisions of the media file. For example, the clause review playbook tool can be used to demarcate an entire paragraph within the media file. The contract engine 228 may also include a third party edit info tool. The third party edit info tool can include a date- and number-detection tool that marks locations in the document having potential fields with key elements. The third party edit info tool may provide a user interface to allow users to specify which fields to track within the media file, to keep the fields up-to-date. The third party edit info tool can be configured in conjunction with a side-by-side media file editing tool so that multiple parties (e.g., including third parties) can edit the media file concurrently on a display or output that indicates all of the edits being made.

Some or all of the tools of the contract engine 228 that involve processing of markers can be referred to as marker differentiator tools. The marker differentiator tools may be periodically updated with better test results, or analysis to ensure that the only differences are the markers being updated. Some or all of the marker differentiator tools may be invisible to certain users or contract parties, while they are visible to the controlling party. The marker differentiator tools can store marker information efficiently, so that repeated fields are properly marked (e.g., conditionals are marked "?? "), which allows tracking of arbitrary text ranges. A display of a client device such as one of the client devices 110, 210 may detect and display when a given marker disappears. The display may also indicate the edit information mode, so that it is clear when a user is correcting conflicts. As an example, the display may provide color coded user edit information so that it is clear which of the multiple parties is editing the media file.

FIG. 5 illustrates a template element including an indication of field inputs previously input into a form section that has changed between different versions of a media file, according to certain aspects of the present disclosure. The template element may include multiple form sections. Each of the form sections may correspond to a specific portion of the media file. For example, when a user inputs information (e.g., via one of the client devices 110, 210) into a particular form section of the template element, that information is used to populate a corresponding portion of the media file. The form sections can include counterparty signer name, counterparty signer email, master agreement date, service name, addendum effective date, comment, and/or the like. As an example, the addendum effective date can refer to a contract finalization date and the comment may be an annotative note to multiple parties negotiating finalization of the media file, such as an annotation that the information input via the template element form section is for correcting erroneous information.

To specify or update information in the media, the user may input or re-input field values into one or more form sections of the template element. For example, the user may input "Nov. 11, 2019" into the master agreement date form section 502 to specify or change a sentence in the media file indicating that a master contract agreement referenced by the media file was entered into on Nov. 11, 2019. For example, the user may input "workflow designer" into the service name form section 506 to specify or change that a contracted service referenced by a sentence is a "workflow designer" service. The user may use an input device, as indicated by a cursor, to select the radio button labeled "update information" 510 to cause the template element to update the media file based on input form section field values. The template element may automatically update based on changes between versions of the media file. A detect tool of a workflow platform that hosts the template element can be configured to update form sections (e.g., names, input field values, etc.) and/or to indicate whether certain field values or elements of the template element has changed. For example, another party besides the user who is part of the multiple party negotiation of the media file may have edited a portion (e.g., sentence, clause, etc.) of the media file containing information corresponding to one or more of the form sections.

As an example, the detect tool can be a smart detect tool configured to determine and indicate at the master agreement detect indication 504 that another party may have changed a portion of the media file to indicate that the master contract agreement reference by the media file was entered into on Nov. 11, 2019 instead of Dec. 5, 2019. That is, the template element may update automatically based on another party other than the user having used the template element or a freeform edit to update the master contract date referenced in the media file. As an example, the detect tool can determine and indicate that the contracted service referenced by the media file is a "workflow designer" service rather than a "blueprint" service, such as the service name detect indication 508. That is, the template element may update automatically based on another party other than the user having used the template element or a freeform edit to update the name of the contracted service referenced in the media file. In this way, the template element may be configured to generate a number of formatted files from the constituent filled out form sections. The field values of the form sections may be used to specify metadata, attributes, and/or the like of the media file. As an example, an original template version of the media file may be generated via the template element and/or a set of attributes (e.g., specified by the user).

The original template version may be used by various parties of the multiple parties as a base media file to asynchronously create edited versions of the media file. Based on the asynchronously created versions or other documents, the template element may be used to generate a compare media file that encodes changes/differences between two input media files as tracked changes. As an example, the tracked changes can be indicated in red font for redlining. The template element can also generate an accept changes media file, such as based on the user indicating that the some or all of the tracked changes in the compare document should be accepted. The template element may also generate a merged version of the media file. As discussed above, the merged version may be based on inserted markers and performing a three way merge on two input documents each having tracked changes with respect to a common ancestor. The two input documents can be edited such that each input document includes tracked changes relative to the common ancestor, such as two input documents that are different relative to the same original media file (e.g., original template media file common ancestor).

The workflow platform is capable of automatically updating template elements so that an updated version of the media file may be updated with relevant template language (e.g., based on updated field values input into updated form sections, new form sections, deleted form sections, etc.) and freeform updates/changes that were previously made to the media file. For example, if a sentence is added or modified in a freeform manner and that modification affects a counterparty name (e.g., changes or deletes the counterparty name), then the corresponding counterparty signer name form section may be updated based on the freeform sentence. In this way, unanticipated changes such as contract language changes that were not anticipated by the template element can be incorporated along with any changes made via the template element to a subsequent or finalized version of the media file. The workflow platform may also use the template element to implement several template tools. For example, the template tools may include a template divergence score tool, an edit document template tool, a concurrent edit tool, an attribution tool, a contract automation level tool, and/or a clause mark tool.

The template divergence score tool can indicate an extent to which a version of the media file diverges from an original template media file. For example, the template divergence score may be calculated based on a percentage of characters (e.g., words, phrases, sentences, etc.) that are changed relative to template language. The edit document template tool can enable the user to see a preview of the media file as it is edited. As an example, the user may update before, after, or during editing via form sections of the template element, as illustrated by FIG. 5. The concurrent edit tool can enable concurrent editing by multiple client devices 110, 210. The attribution tool may identify the origin of edits/changes in various versions of the media file. As an example, the attribution tool may use different colors, patterns, coding, and/or the like to highlight or identify which authors have modified which portions of the media file. A corresponding comment may be included to facilitate identification of which authors added, deleted, or modified different words or sentences within various versions of the media file. Similarly to the template divergence score tool, the contract automation level tool may quantify a level of template use relative to the media file.

The contract automation level tool can compute a percentage of the media file that was generated from a template, for example. This template percentage can be compared to relative percentages of the media file that were edited by other authors such as a legal counsel, a counterparty, and/or the like. The clause mark tool may be used to mark or indicate clauses in an initial version of the media file for determination of where the clause was moved to in subsequent versions of the media file (e.g., new location of the clause). For example, if a certain clause is located as a certain location in version N of the media file, the clause mark tool can detect how the clause is re-located in version N+1 based on the added marker text inserted in pre-processing prior to a three way merge of version N and version N+1 with a common ancestor. The clause mark tool may be configured to search for a deleted marker containing text of the certain clause. A machine learning algorithm may be used in conjunction with the clause mark tool to produce a library of clauses that are likely to be edited or switched between versions of the media file.

Figure 6A:
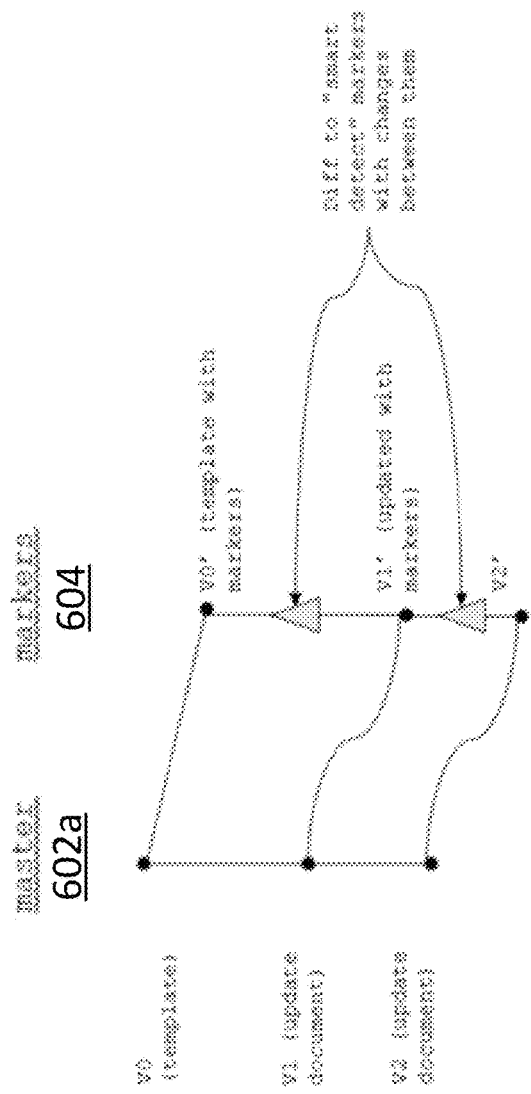
FIGS. 6A-6B illustrate updating markers branches and template branches relative to masters branches to indicate changes in markers and templates, respectively, according to certain aspects of the present disclosure.
Figure 6B:
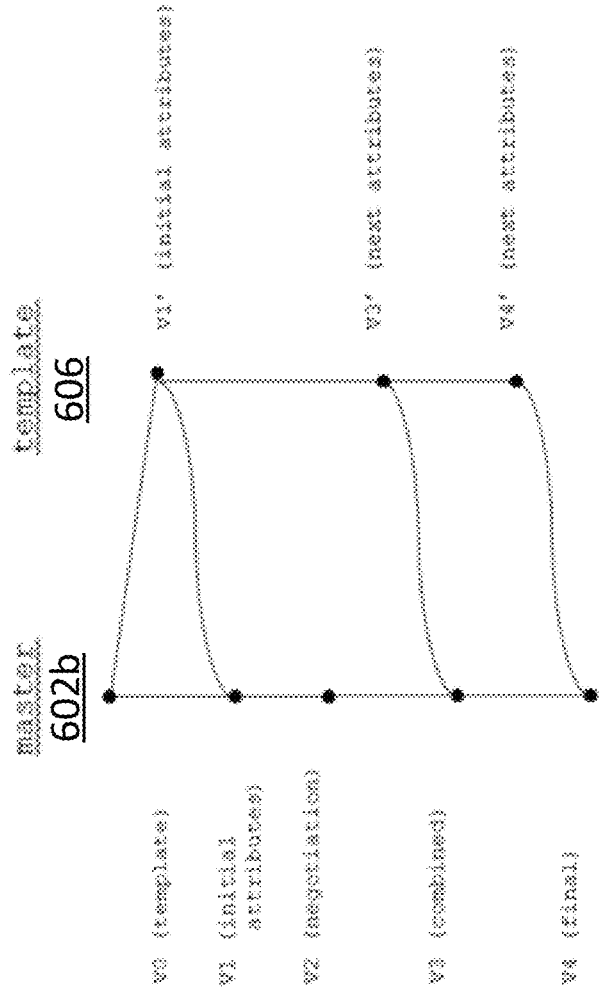

FIGS. 6A-6B illustrate updating markers branches and template branches relative to masters branches to indicate changes in markers and templates, respectively, according to certain aspects of the present disclosure. FIG. 6A shows a mapping of a master branch 602*a* to a markers branch 604. FIG. 6B shows a mapping of a master branch 602*b* to a template branch 606. The mapping shown in FIG. 6A-6B may be used to indicate changes detected via markers between various versions of a media file and to update a template element of a workflow platform, respectively. That is, FIG. 6A shows an example of updating markers using version control (e.g., Git version control).

The master branch 602*a* may comprise three nodes, including a version 0 (V0) node, a version 1 (V1) node, a version 2 (V2) node, and/or the like. The markers branch 604 may comprise three nodes, including a version 0' (V0') node, a version 1' (V1') node, a version 2' (V2') node, and/or the like. The V0 node in the master branch 602*a* may be generated via the template element and be considered an original template version of the media file. Subsequent nodes of the master branch may be created as updated versions of the original template version. The markers of the markers branch 604 may be used as part of processing and a three-way merge tool for detecting edits for updating versions of the media file. For example, the first node of the markers branch may refer to the original template version with inserted markers of node V0' to indicate key portion(s) of the media file. As an example, the V0' media file can be generated from the template version with marker text being added around inserted fields to form the first version in the markers branch 604.

Generating the initial V0' and other nodes of the markers branch 604 may be performed in a variety of ways. One method includes initial use of template generation code and subsequently calling the template generation code a second time when all simple string replacements are surrounded by beginning and ending markers. Another method may involve analyzing the template generation code to mark conditional clauses, repeated paragraphs, table rows, and/or the like. The markers may be used to detect edits to multiple constituent components of the media file, such as basic attributes, metadata, as well as more complicated components including multiform changes, conditional clauses, complex logic for clause generation, and/or the like. To detect whether a marker has changed, the workflow platform (e.g., contract engine 228) may inspect the contents between a set of beginning and ending markers to verify whether any redlines appear. The "before" and "after" versions can be derived by respectively rejecting and accepting all changes.

The workflow platform may encode the name of a particular attribute in the beginning and ending markers themselves. For example, an attribute such as a counterparty name can be encoded into a marker as metadata. The workflow platform may maintain a mapping of marker names to attributes that affect them. Subsequent updates to the master branch can then be merged into the markers branch. For example, the V1 node of the masters branch may represent an update to the original template version while pre-processing and post-processing of markers between the V0' node and the V1' node of the markers branch 604 can be performed to identify edits/changes. The edits can be identified based on markers having changes between different versions of the media file such as a change in location of one or more markers from the V0' node and the V1' node.

Similarly, further edits can be identified based on a change in location of one or more markers from the V1' node and the V2' node. These further edits may cause updating of the master branch 602 from node V1 to V2, which reflects an update to the media file based on updated markers. The markers may be maintained in a parallel branch, and changes are merged from the master to that branch. Merging changes based on the markers may involve a modified differencing processing (e.g., pre-processing to insert markers, post-processing on a generated difference document, and/or the like) to detect text additions or removals of the markers themselves. This way, the differencing process modifies the three-way merge being performed. In general, the master branch 602a and the markers branch 604 includes sequences of different versions of a media file evolving from top to bottom.

FIG. 6B shows an example of updating templates using version control between a master branch 602b and a template branch 606. The updating of templates may be similar to merging separate branches via the version control. For example, the nodes of the master branch 602b and the template branch 606 may update as attributes of the media file change. Attributes may refer to metadata such as descriptive tags of portions of the media file, such as pricing information, party names, contract provision dates, and/or the like. The master branch 602b may comprise five nodes, including a version 0 (V0) node, a version 1 (V1) node, a version 2 (V2) node, a version 3 (V3) node, a version 4 (V4) node and/or the like. The template branch 606 can comprise three nodes, including a version 1' (V1') node, a version 3' (V3') node, a version 4' (V4') node, and/or the like. When attributes of the media file change, two nodes (e.g., corresponding to documents or media file versions) V1' and V3' may be generated. The node V1' of the template branch 606 may correspond to a document generated based on previous attributes prior to the change while the node V3' of the template branch 606 may correspond to a document generated based on updated attributes after the change. The node V2 of the master branch 602b can be considered as corresponding to a current edited version of the media file.

The workflow platform may perform a three-way merge to merge the edits of V3' and V2 with V1' as the base common ancestor. For example, the workflow platform may compare V3' with V1', compare V2 with V1', and merge changes from the two documents resulting from the two separate comparisons to generate node V3 of the master branch 602b. When changes are accepted at node V3, this may be saved as the next version of the master branch 602b. In this way, changes in attributes may be "version controlled" based on merging different versions via the master branch 602b and the template branch 606. Accordingly, the nodes of the master branch 602b can progress from a template node V0, an initial attribute node V1, a negotiation node V2, a combined node V3, to a final node V4, which may track a progression of a negotiation of the media file such as a contract. The nodes of the template branch 606 can progress from an initial attribute node V1', a next attribute node V3', and a next attribute node V4', which may track a progression of changes in attributes of the media file.

The master branch 602b and the template branch 606 may be used to update the template element of the workflow platform. Such updating may enable the template element to incorporate authored changes to various versions of the media file from both free form edits and changes made via the template element. Such updating may include adding form sections, deleting form sections, changing form sections, adding field values to one or more form sections, deleting field values to one or more form sections, changing field values to one or more form sections, and/or the like. FIG. 6B illustrates how the template branch 606 comprises nodes corresponding to versions generated via the template element while the master branch 602b comprises nodes corresponding to actual versions of the media file. As an example, whenever an edit information tool is used by a user (e.g., user uses the edit information tool for editing attribute(s) to generate another document form the latest template version of the media file via the template element), another node (e.g., commit) may be added to the template branch 606 and subsequently be merged into the master branch 602b. A contract engine 228 of the workflow platform may also process non-template media files, such as third party paper documents (e.g., bibliographic references and the like). Accordingly, in such situations, the contract engine 228 may request a user interaction for marking selected areas of a non-template media file or other media files.

Figure 7:
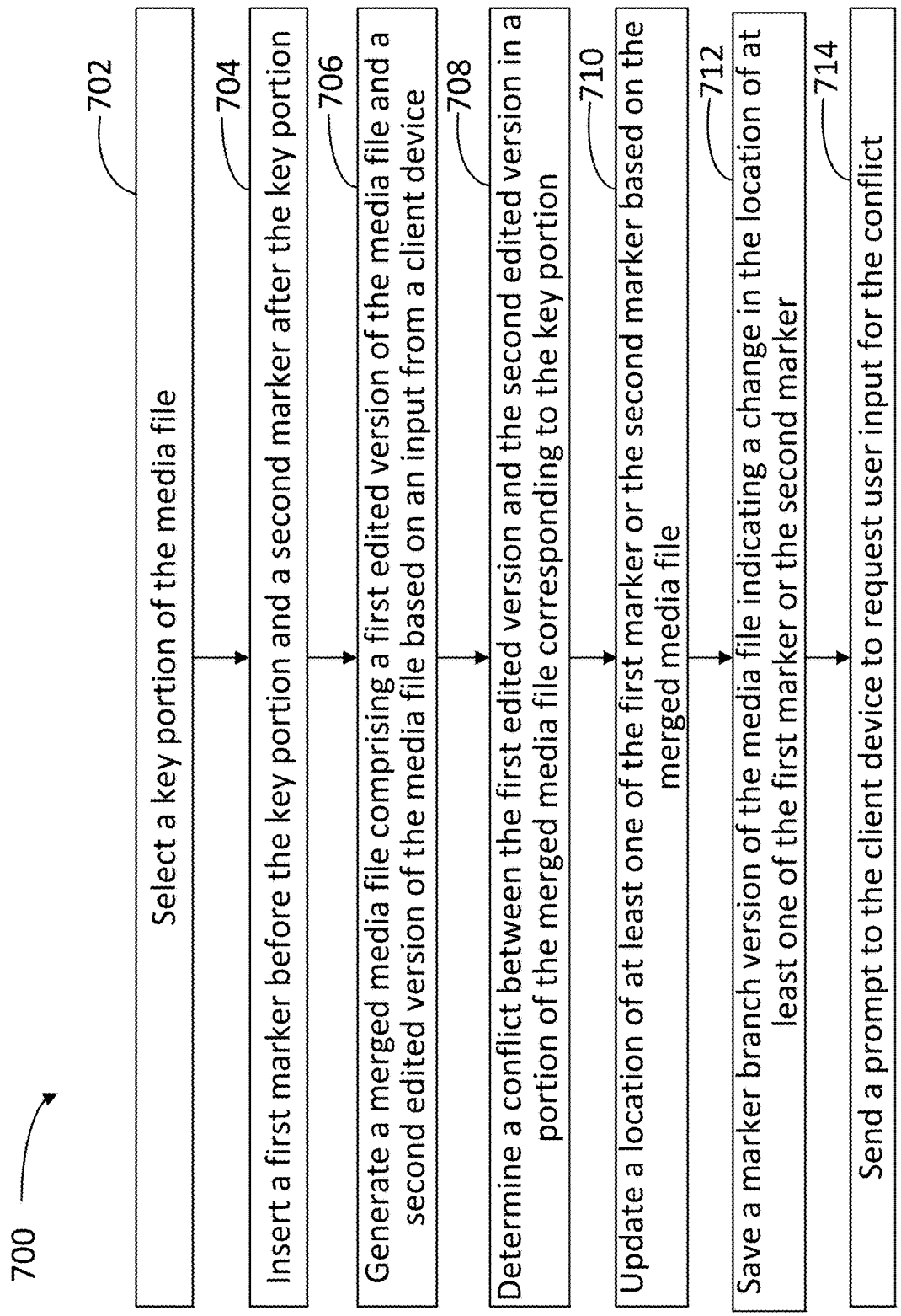
FIG. 7 is an example flow diagram for detecting changes to uploaded documents in a workflow platform, according to certain aspects of the present disclosure.

The techniques described herein may be implemented as method(s) that are performed by physical computing device(s); as one or more non-transitory computer-readable storage media storing instructions which, when executed by computing device(s), cause performance of the method(s); or as physical computing device(s) that are specially configured with a combination of hardware and software that causes performance of the method(s). FIG. 7 is an example flow diagram for detecting changes to uploaded documents in a workflow platform, according to certain aspects of the present disclosure.

FIG. 7 illustrates an example flow diagram (e.g., process 700) for detecting changes to uploaded documents in a workflow platform, according to certain aspects of the disclosure. For explanatory purposes, the example process 700 is described herein with reference to one or more of the figures above. Further for explanatory purposes, the steps of the example process 700 are described herein as occurring in serial, or linearly. However, multiple instances of the example process 700 may occur in parallel, overlapping in time, almost simultaneously, or in a different order from the order illustrated in method 700. A method consistent with some embodiments disclosed herein may include at least one, but not all, of the steps in method 700. For purposes of explanation of the subject technology, the process 700 will be discussed in reference to one or more of the figures above. As an example, the process 700 may be performed at least partially by any one of the servers 130, 211 and client devices 110, 210 illustrated in FIGS. 1-2. For example, at least some of the steps in method 700 may be performed by one component in a system including the client device 110, 210 running code for a browser and an application to access the server 130, 211 or the database (e.g., the contract engine or the algorithm, cf. FIG. 1). Accordingly, at least some of the steps in method 700 may be performed by a processor executing commands stored in a memory of the server 130, 211 or of the client device 110, 210, or accessible by the server 130, 211 or by the client device 110, 210.

At step 702, a key portion (e.g., part of section 412) of a media file may be selected. For example, the key portion can correspond to a form section of a template element of the workflow platform for managing the media file. For example, the key portion can correspond to master agreement date language as indicated in FIG. 3. At step 704, a first marker (e.g., first marker 302, 306, 310) before the key portion of the media file and a second marker (e.g., second marker 304, 308, 312) after the key portion of the media file may be inserted. According to an aspect, inserting the first marker and the second marker can comprise processing the media file to insert tags at fields of the media file, wherein the tags comprise textual tags or comment tags.

At step 706, a merged media file comprising a combination of a first edited version of the media file and a second edited version of the media file may be generated. According to an aspect, generating the merged media file comprises executing a three way merge operation based on a conflict resolution heuristic. For example, the conflict resolution heuristics may include an equivalent changes heuristic, a colliding insertions heuristic, a comment ranges heuristic, conflict non-changes heuristic, and/or the like. For example, a media file compare tool of the workflow platform may perform the three way merge operation for two or more versions of the media file with a base media file (e.g., common ancestor). For example, the base media file may be generated via the template element.

At step 708, a conflict between the first edited version of the media file and the second edited version of the media file may be determined. For example, the conflict may be in a portion of the merged media file corresponding to the key portion of the media file. According to an aspect, determining the conflict comprises determining that a location of at least one of the first marker or the second marker is associated with a conflicted portion of the merged media file. For example, the characters "<," ">," and "|" can indicate boundaries of the conflicted portion of the merged media file. In some embodiments, the determined conflict between the first edited version of the media file and the second edited version may merely indicate that the key portion of the media file has changed rather than representing a conflict that needs to be resolved. For example, step 708 may merely involve comparing markers of a latest edited version of the media file with markers of a previous edited version of the media file to perform actions such as: adjusting markers as necessary, annotating markers requesting human intervention, detecting changed data within the key portion(s) of the media file, and/or the like. For example, after the first marker and/or second marker are moved, the workflow platform may be used to inspect the contents of the media file between the first marker and the second marker in order to check whether the contents have changed from one version of the media file to another version.

If the contents have changed, a prompt can be sent to the client device to inform the corresponding user/client that the contents of the media file have changed and to prompt the corresponding user/client to take action. As an example, an action that can be performed may be updating structured metadata, such as if the changed contents of the media file represent a change in date. As an example, an action that can be performed may be reviewing a key paragraph or clause of the media file implicated by the changed contents of the media file. For example, the corresponding user/client may review and specifically annotate (e.g., flag) a particular clause that was changed (e.g., as indicated by the changed contents of the key portion of the media file). The particular clause can be a Limitation of Liability clause, for example. The client device may be used by the corresponding user/client to verify whether the structured metadata changed or whether the particular clause (e.g., part of a sensitive paragraph) was updated. Other suitable actions and the like can be taken by the corresponding user/client via the client device. The prompt being sent may also prompt the client device to select, for markers flagged as needing human intervention, the corresponding appropriate marker locations.

At step 710, a location of at least one of the first marker or the second marker may be updated. According to an aspect, updating the location of at least one of the first marker or the second marker comprises determining that a change in at least one of the first marker or the second marker comprises an addition of text corresponding to the merged media file, a change of the text corresponding to the merged media file, or a removal of the first marker or the second marker. According to an aspect, updating the location of at least one of the first marker or the second marker comprises determining a portion of the merged media file having changed metadata. According to an aspect, updating the location comprises moving the first marker (e.g., first marker 302, 306, 310) to a beginning of a conflicted portion of the merged media file and the second marker (e.g., second marker 304, 308, 312) to an end of the conflicted portion of the merged media file. For example, the moving may be based on changed metadata, such as a changed attribute.

At step 712, a marker branch version (e.g., markers branch 604) of the media file indicating a change in the location of at least one of the first marker or the second marker may be saved. For example, saving the marker branch version of the media can include saving updated markers, content, and conflicts (e.g., relative to different versions of the media file). According to an aspect, saving the marker branch version of the media file comprises saving, via a master branch version (e.g., master branch 602b) of the media file, a template version (e.g., 606) of the media file having the first marker and the second marker after updating the location of at least one of the first marker or the second marker. At step 714, a prompt may be sent to the client device to request user input for the conflict. According to an aspect, sending the prompt comprises determining a conflict resolution option of a plurality of conflict resolution options. For example, a user input from the client device (e.g., client device 110, 210) may be used to select a conflict resolution option from the plurality of options in response to the prompt. According to an aspect, sending the prompt comprises sending an indication of a first tracked change corresponding to the first edited version of the media file and sending a second tracked change corresponding to the second edited version of the media file. The plurality of conflict resolution options can include accepting the first tracked change, accepting the second tracked change, accepting a combination of the first tracked change and the second tracked change, selecting an order of the first tracked change and the second tracked change, and/or the like.

According to an aspect, the process 700 may further include applying markers to the marker branch version (e.g., markers branch 604) to indicate at least one of: conditional clauses, repeated paragraphs, table rows, or insertion of variable text. According to an aspect, the process 700 may further include receiving the first edited version of the media file having a first attribute from a first user device (e.g., client device 110, 210) and receiving the second edited version of the media file having a second attribute from a second user device (e.g., client device 110, 210). According to an aspect, the process 700 may further include determining that the conflict comprises an edit from the first edited version of the media file that applies to the portion of the merged media file. For example, the workflow platform may determine conflicting edits from two authors at the portion of the merged media file. The process 700 may further include providing a copy of the media file to the client device (e.g., client device 110, 210). According to an aspect, the process 700 may further include generating, via the media file template, a third edited version of the media file including the change in the attribute of the media file.

According to an aspect, the process 700 may further include determining a change in an attribute of the media file based on the change in the location of the at least one of the first marker (e.g., first marker 302, 306, 310) or the second marker (e.g., second marker 304, 308, 312). According to an aspect, the process 700 may further include updating a media file template based on the change in the attribute. According to an aspect, updating the media file template comprises updating metadata associated with the media file template based on the change in the attribute. According to an aspect, the process 700 may further include determining that the conflict comprises an edit from the first edited version of the media file that applies to the portion of the merged media file.

Figure 8:
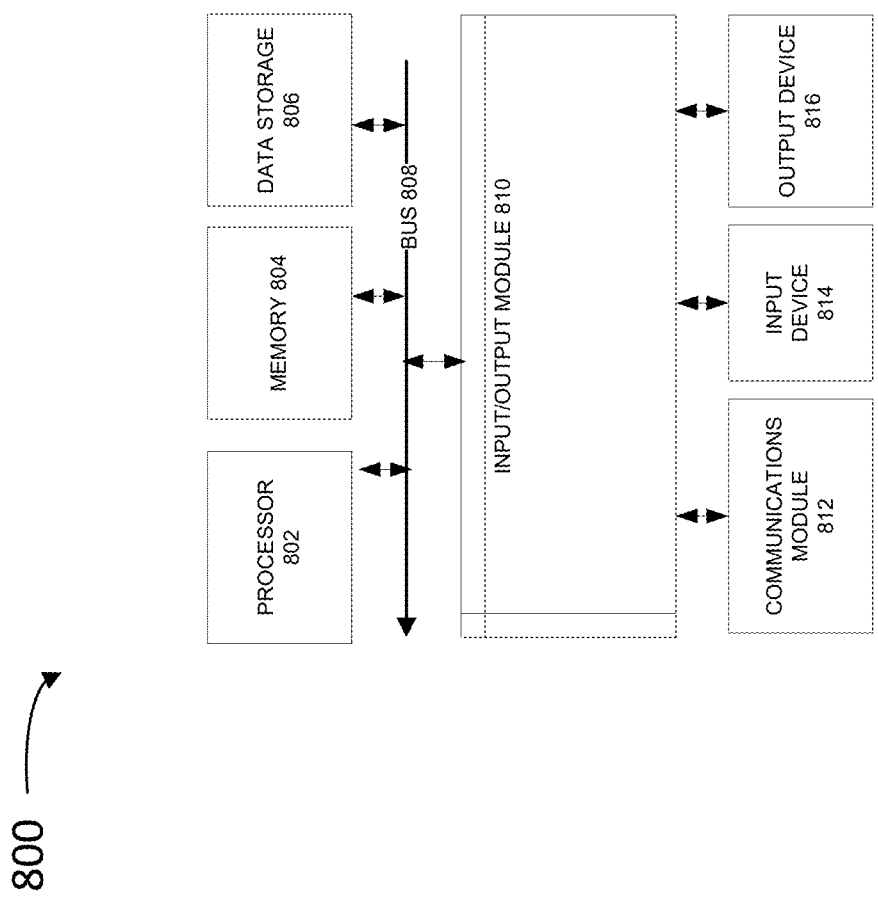
FIG. 8 is a block diagram illustrating an example computer system with which aspects of the present disclosure can be implemented.

FIG. 8 is a block diagram illustrating an exemplary computer system 800 with which aspects of the subject technology can be implemented. In certain aspects, the computer system 800 may be implemented using hardware or a combination of software and hardware, either in a dedicated server, integrated into another entity, or distributed across multiple entities.

Computer system 800 (e.g., server and/or client) includes a bus 808 or other communication mechanism for communicating information, and a processor 802 coupled with bus 808 for processing information. By way of example, the computer system 800 may be implemented with one or more processors 802. Processor 802 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 800 can include, in addition to hardware, code that creates an execution environment for the computer program in question, e.g., code that constitutes processor firmware, a protocol stack, a database management system, an operating system, or a combination of one or more of them stored in an included memory 804, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 808 for storing information and instructions to be executed by processor 802. The processor 802 and the memory 804 can be supplemented by, or incorporated in, special purpose logic circuitry.

The instructions may be stored in the memory 804 and implemented in one or more computer program products, i.e., one or more modules of computer program instructions encoded on a computer-readable medium for execution by, or to control the operation of, the computer system 800, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 804 may also be used for storing temporary variable or other intermediate information during execution of instructions to be executed by processor 802.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 800 further includes a data storage device 806 such as a magnetic disk or optical disk, coupled to bus 808 for storing information and instructions. Computer system 800 may be coupled via input/output module 810 to various devices. The input/output module 810 can be any input/output module. Exemplary input/output modules 810 include data ports such as USB ports. The input/output module 810 is configured to connect to a communications module 812. Exemplary communications modules 812 include networking interface cards, such as Ethernet cards and modems. In certain aspects, the input/output module 810 is configured to connect to a plurality of devices, such as an input device 814 and/or an output device 816. Exemplary input devices 814 include a keyboard and a pointing device, e.g., a mouse or a trackball, by which a user can provide input to the computer system 800. Other kinds of input devices can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 816 include display devices such as an LCD (liquid crystal display) monitor, for displaying information to the user.

According to one aspect of the present disclosure, the above-described computing systems can be implemented using a computer system 800 in response to processor 802 executing one or more sequences of one or more instructions contained in memory 804. Such instructions may be read into memory 804 from another machine-readable medium, such as data storage device 806. Execution of the sequences of instructions contained in the main memory 804 causes processor 802 to perform the process steps described herein. One or more processors in a multi-processing arrangement may also be employed to execute the sequences of instructions contained in memory 804. In alternative aspects, hard-wired circuitry may be used in place of or in combination with software instructions to implement various aspects of the present disclosure. Thus, aspects of the present disclosure are not limited to any specific combination of hardware circuitry and software.

The subject technology is illustrated, for example, according to various aspects described below. Various examples of aspects of the subject technology are provided as examples, and do not limit the subject technology. In one aspect, a method may be an operation, an instruction, or a function and vice versa. In one aspect, a method may be amended to include some or all of the words (e.g., instructions, operations, functions, or components) recited in other one or more methods, one or more words, one or more sentences, one or more phrases, and/or one or more paragraphs.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." Pronouns in the masculine (e.g., his) include the feminine and neutral gender (e.g., her and its) and vice versa. The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No clause element is to be construed under the provisions of 35 U.S.C. § 112, sixth paragraph, unless the element is expressly recited using the phrase "means for" or, in the case of a method clause, the element is recited using the phrase "step for."

While this specification contains many specifics, these should not be construed as limitations on the scope of what may be described, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially described as such, one or more features from a described combination can in some cases be excised from the combination, and the described combination may be directed to a subcombination or variation of a subcombination.

The subject matter of this specification has been described in terms of particular aspects, but other aspects can be implemented and are within the scope of the following clauses. For example, while operations are depicted in the drawings in a particular order, this should not be understood as requiring that such operations be performed in the particular order shown or in sequential order, or that all illustrated operations be performed, to achieve desirable results. The actions recited in the clauses can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the described subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately described subject matter.

The subject matter is not intended to be limited to the aspects described herein, but are to be accorded the full scope consistent with the language of the claims and to encompass all legal equivalents. Notwithstanding, none of the subject matter is intended to embrace subject matter that fails to satisfy the requirements of the applicable patent law, nor should they be interpreted in such a way.

To the extent that the terms "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

The invention claimed is:

1. A computer-implemented method for processing conflicting edits, in different versions of a textual document, that result from inputs by different users to a workflow platform configured to manage asynchronous editing of the textual document, the method comprising:

creating, by a server executing the workflow platform, a marked base version of the textual document based on a template indicating a plurality of fields to be included in the textual document, wherein the marked base version comprises a first marker inserted before a key portion corresponding to a first field, of the plurality of fields, and a second marker inserted after the key portion;

receiving, by the server and from a first client device, first inputs corresponding to a first edited version of the textual document, wherein the first edited version comprises a first edit to content of the key portion identified by the first marker and the second marker;

receiving, by the server, from a second client device, second inputs corresponding to a second edited version of the textual document, wherein the second inputs are received via a form user interface comprising a plurality of text input field elements each corresponding to a respective field of the plurality of fields indicated by the template, and wherein the second inputs comprise a second edit to the first field;

determining, by the server and based on a three-way merge of the marked base version, the first edited version, and the second edited version, a conflict in the key portion corresponding to the first field caused by the first edit or the second edit, wherein the first edit is determined to correspond to the first field based on one or more of the first marker or the second marker; and based on determining the conflict, causing, by the server, output of a display indicating the conflict in the key portion and indicating options for resolving the conflict, wherein the first inputs comprise a freeform edit made directly to the text content of the textual document via a second user interface different from the form user interface.

2. The computer-implemented method of claim 1, wherein the first inputs further comprise an input deleting a portion of the textual document associated with the first field.

3. The computer-implemented method of claim 1, wherein determining the conflict comprises determining the conflict further based on the first edited version lacking one or more of the first marker or the second marker.

4. The computer-implemented method of claim 1, wherein the first marker and the second marker comprise tags indicating subject matter of the key portion.

5. The computer-implemented method of claim 1, further comprising at least one of:
   updating a location of the first marker to a beginning of the conflict; or
   updating a location of the second marker to an end of the conflict.

6. The computer-implemented method of claim 1, wherein receiving the first inputs comprises receiving the first edited version as an attachment to an email.

7. The computer-implemented method of claim 1, wherein determining the conflict comprises one or more of:
   determining that an edit removes one or more fields of the plurality of fields indicated by the template; or
   determining that an edit includes content that is incompatible with one or more fields of the plurality of fields.

8. A computing device configured to process conflicting edits, in different versions of a textual document, that result from inputs by different users to a workflow platform configured to manage asynchronous editing of the textual document, the computing device comprising:
   one or more processors; and
   memory storing instructions that, when executed by the one or more processors, cause the one or more processors to:
   create, a marked base version of the textual document based on a template indicating a plurality of fields to be included in the textual document, wherein the marked base version comprises a first marker inserted before a key portion corresponding to a first field, of the plurality of fields, and a second marker inserted after the key portion;
   receive, from a first client device, first inputs corresponding to a first edited version of the textual document, wherein the first edited version comprises a first edit to content of the key portion identified by the first marker and the second marker;
   receive, from a second client device, second inputs corresponding to a second edited version of the textual document, wherein the second inputs are received via a form user interface comprising a plurality of text input field elements each corresponding to a respective field of the plurality of fields indicated by the template, and wherein the second inputs comprise a second edit to the first field;
   determine, based on a three-way merge of the marked base version, the first edited version, and the second edited version, a conflict in the key portion corresponding to the first field caused by the first edit or the second edit, wherein the first edit is determined to correspond to the first field based on one or more of the first marker or the second marker; and
   based on determining the conflict, cause, output of a display indicating the conflict in the key portion and indicating options for resolving the conflict,
   wherein the first inputs comprise a freeform edit made directly to the text content of the textual document via a second user interface different from the form user interface.

9. The computing device of claim 8, wherein the first inputs further comprise an input deleting a portion of the textual document associated with the first field.

10. The computing device of claim 8, wherein the instructions cause the computing device to determine the conflict further based on the first edited version lacking one or more of the first marker or the second marker.

11. The computing device of claim 8, wherein the first marker and the second marker comprise tags indicating subject matter of the key portion.

12. The computing device of claim 8, wherein the instructions further cause the computing device to:
   update a location of the first marker to a beginning of the conflict, or update a location of the second marker to an end of the conflict.

13. The computing device of claim 8, wherein receiving the first inputs comprises receiving the first edited version as an attachment to an email.

14. The computing device of claim 8, wherein determining the conflict comprises one or more of:
   determining that an edit removes one or more fields of the plurality of fields indicated by the template; or
   determining that an edit includes content that is incompatible with one or more fields of the plurality of fields.

15. One or more non-transitory computer readable media storing instructions that, when executed by a processor, cause a server executing a workflow platform configured to manage asynchronous editing of a textual document to process conflicting edits, in different versions of the textual document, that result from inputs by different users to the workflow platform, by causing the server to perform steps comprising:
   creating a marked base version of the textual document based on a template indicating a plurality of fields to be included in the textual document, wherein the marked base version comprises a first marker inserted before a key portion corresponding to a first field, of the plurality of fields, and a second marker inserted after the key portion;
   receiving, from a first client device, first inputs corresponding to a first edited version of the textual document, wherein the first edited version comprises a first edit to content of the key portion identified by the first marker and the second marker;
   receiving, from a second client device, second inputs corresponding to a second edited version of the textual document, wherein the second inputs are received via a form user interface comprising a plurality of text input field elements each corresponding to a respective field of the plurality of fields indicated by the template, and wherein the second inputs comprise a second edit to the first field;
   determining, based on a three-way merge of the marked base version, the first edited version, and the second edited version, a conflict in the key portion corresponding to the first field caused by the first edit or the second edit, wherein the first edit is determined to correspond to the first field based on one or more of the first marker or the second marker; and based on determining the conflict, causing, output of a display indicating the conflict in the key portion and indicating options for resolving the conflict, wherein the first inputs comprise a freeform edit made directly to the text content of the textual document via a second user interface different from the form user interface.

16. The computer readable media of claim 15, wherein determining the conflict comprises determining the conflict further based on the first edited version lacking one or more of the first marker or the second marker.

17. The computer readable media of claim 15, wherein receiving the first inputs comprises receiving the first edited version as an attachment to an email.

\* \* \* \* \*